US012139393B2

(12) United States Patent
Szeteli et al.

(10) Patent No.: US 12,139,393 B2
(45) Date of Patent: Nov. 12, 2024

(54) ARRANGEMENT WITH A CONTAINER AND A TAMPER-EVIDENT CLOSURE

(71) Applicant: AS Strömungstechnik GmbH, Ostfildern (DE)

(72) Inventors: Andreas Szeteli, Filderstadt (DE); Nico Fischer, Filderstadt (DE)

(73) Assignee: AS Strömungstechnik GmbH, Ostfildern (DE)

( * ) Notice: Subject to any disclaimer, the term of this patent is extended or adjusted under 35 U.S.C. 154(b) by 84 days.

(21) Appl. No.: 18/125,147

(22) Filed: Mar. 23, 2023

(65) Prior Publication Data

US 2023/0303385 A1 Sep. 28, 2023

(30) Foreign Application Priority Data

Mar. 23, 2022 (DE) ......................... 102022106845.5

(51) Int. Cl.
*B67D 7/34* (2010.01)
*B67D 7/02* (2010.01)
*B67D 7/58* (2010.01)

(52) U.S. Cl.
CPC ............ *B67D 7/34* (2013.01); *B67D 7/0288* (2013.01); *B67D 7/58* (2013.01)

(58) Field of Classification Search
CPC ....... B67D 7/34; B65D 55/024; B65D 55/026
See application file for complete search history.

(56) References Cited

U.S. PATENT DOCUMENTS 4,711,372 A * 12/1987 Gach .................. B65D 47/0885 222/23
5,884,788 A * 3/1999 Wilde ................ B65D 51/1688 215/349
2008/0047976 A1* 2/2008 Scheer .............. B65D 47/0809 222/153.06

FOREIGN PATENT DOCUMENTS

EP 0977702 B1 10/2001

* cited by examiner

*Primary Examiner* — Jason K Niesz
(74) *Attorney, Agent, or Firm* — Michael Soderman

(57) ABSTRACT

An arrangement with a container (3) having a container opening via which a storage medium (3) can be supplied to or removed from the container (3). The container opening can be sealed with a closure means and secured with a tamper-evident safeguard (9). The tamper-evident safeguard (9) has a safeguard body (10) with a lower part (13), and an upper part (12) that is displaceably mounted on the lower part (13), and a security seal (11). The latter is mounted on the safeguard body (10) fastened to the immersion pipe (4). When the tamper-evident safeguard (9) is released, there is relative movement between the upper part (12) and the lower part (13), by which a segment of the security seal (11) is separated and is guided into a receiving chamber (21) of the lower part (13).

23 Claims, 9 Drawing Sheets

1

ARRANGEMENT WITH A CONTAINER AND A TAMPER-EVIDENT CLOSURE

CROSS REFERENCE TO RELATED APPLICATIONS

This application claims the priority of DE 102022106845.5 filed on 2022 Mar. 23; this application is incorporated by reference herein in its entirety.

BACKGROUND

The invention relates to an arrangement with a container and a tamper-evident safeguard.

Such containers are generally used for storing storage media, particularly liquids. The container generally has a container opening via which the storage media can be removed from the container or supplied to it. The container opening can be closed with a closure means and secured against unauthorized access with a tamper-evident safeguard.

In particular, such arrangements with containers can be part of a removal system.

Such a removal system is known from EP 0 977 702 B1. This removal system is used for filling and draining containers, particularly barrels filled with liquid chemicals. The containers have, respectively, an immersion pipe via which liquids stored in the container can be removed and via which liquids can be supplied to the container. The removal system has a removal head that is connected to the immersion pipe of the respective container.

Liquid is then removed from the container via the removal head, or, as the case may be, supplied to it. For this purpose, a pump is connected via the removal head in order to remove or supply fluid.

The fluids stored in the containers are typically special chemicals in liquid form.

On the one hand, a high degree of purity is required of these special chemicals, i.e., contaminants must be kept away from these chemicals. On the other hand, these special chemicals can be hazardous substances, such that for this reason alone, uncontrolled leakage of liquid must be prevented.

These requirements also apply particularly when transporting the containers. The removal head is taken off after filling or draining a container. The container is then closed with a closure. To protect against tampering, a tamper-evident safeguard with a security seal is then arranged on the immersion pipe that has been closed with the closure.

Known tamper-evident safeguards have two half-shells that can be folded against one another, which are fitted onto the immersion pipe and then folded together and connected by a security seal. The container can therefore only be opened by breaking open the security seal, which then allows to determine whether the container has been opened without authorization.

Such a tamper-evident safeguard is disadvantageous in that it projects far beyond the top of the immersion pipe. Therefore, the tamper-evident safeguard can easily be ripped off when handling the containers, particularly when stacking the containers. It is additionally disadvantageous that when opening the tamper-evident safeguard and breaking open the security seal, their individual parts can fall out and, in contact with the liquid, end up in a container or in its environment.

SUMMARY

The invention relates to an arrangement with a container (3) having a container opening via which a storage medium (3) can be supplied to or removed from the container (3). The container opening can be sealed with a closure means and secured with a tamper-evident safeguard (9). The tamper-evident safeguard (9) has a safeguard body (10) with a lower part (13), and an upper part (12) that is displaceably mounted on the lower part (13), and a security seal (11). The latter is mounted on the safeguard body (10) fastened to the immersion pipe (4). When the tamper-evident safeguard (9) is released, there is relative movement between the upper part (12) and the lower part (13), by which a segment of the security seal (11) is separated and is guided into a receiving chamber (21) of the lower part (13).

DETAILED DESCRIPTION

The invention seeks to solve the problem by providing improved protection against tampering for containers of the type mentioned at the outset.

The features of claim 1 are provided to solve this problem. Advantageous embodiments and useful further developments of the invention are described in the dependent claims.

The invention relates to an arrangement with a container with a container opening via which a storage medium can be supplied to the container or can be removed from the container. The container opening can be closed with a closure means and secured with a tamper-evident safeguard. The tamper-evident safeguard has a safeguard body with a lower part, and an upper part that is displaceably mounted on the lower part, and a security seal. The latter is mounted on the safeguard body fastened to the immersion pipe. When the tamper-evident safeguard is released, there is relative movement between the upper part and the lower part, whereby a segment of the security seal is separated and is guided into a receiving chamber of the lower part.

According to a first variant of the invention, an immersion pipe is mounted inside the container, to which tube a removal head of a removal system can be connected. To supply or remove a liquid constituting the storage medium to or from the container, the immersion pipe can be closed and can be secured with a tamper-evident safeguard when the removal head is taken off.

The container according to the invention therefore has an immersion pipe to which a removal head of a removal system can be connected to supply liquid to the container or remove liquid from it.

The container forms a transportable unit. To protect against tampering, the container is closed and secured with a tamper-evident safeguard. According to the invention, the tamper-evident safeguard according to the invention [sic] has a closure body with a lower part that is used for fastening to the immersion pipe, and an upper part that is displaceably mounted relative to the lower part. The upper part and the lower part of the closure body can be connected to a security seal to secure against tampering.

According to the invention, the tamper-evident safeguard is implemented such that to open the tamper-evident safeguard, the upper part necessarily performs a relative motion relative to the lower part such that the security seal is destroyed, i.e., is broken open. Protection against tampering is provided in this manner, since the broken open security seal allows one to immediately detect that the tamper-evident safeguard was opened particularly without authorization, and an attempt was made to access the container without authorization.

According to the invention, a receiving chamber is provided in the lower part of the safeguard body. When the tamper-evident safeguard is removed, a segment of the security seal, due to the relative motion between the upper part and the lower part, is separated and caught in the receiving chamber. This prevents the segment of the security seal from falling off in an uncontrolled manner, particularly preventing undesired contact between the segment and the liquid of a container, whereby the functionality of the tamper-evident safeguard, and therefore, that of the container secured with the tamper-evident safeguard, is enhanced.

Advantageously, the security seal has an upper segment and a lower segment, wherein when the tamper-evident safeguard is fastened to the immersion pipe, the upper segment of the security seal is mounted within a seating of the upper part, and the lower segment of the security seal projects into the region of the receiving chamber.

When the security seal is mounted on the safeguard body and an attempt is made to open this tamper-evident safeguard, then, due to the relative motion between the upper part and the lower part, the lower segment of the security seal is separated and caught in the receiving chamber. The upper segment remains in the seating, such that an uncontrolled escape of the upper segment of the security seal does not occur.

Advantageously, the seating is formed by a depression on the top of the upper part.

The edge of the upper segment of the security seal tightly abuts the edge of the upper part delimiting the depression.

The upper segment of the security seal is therefore adequately positionally secured in the seating, such that the upper segment remains on the upper part when the security seal is destroyed.

Advantageously, during the relative motion of the upper part relative to the lower part, the lower segment is guided against a mechanical separation means and, in the process, is separated from the upper segment.

Expediently, the mechanical separation means is formed by a stop projecting into the receiving chamber.

The stop is formed particularly by a crosspiece in the lower part.

From a design perspective, this ensures at once a very simple and reliable separation of the lower segment of the security seal when a relative movement of the upper part relative to the lower part occurs.

According to an advantageous embodiment, an outlet opening is provided on the jacket surface of the lower part via which outlet opening the separated lower segment of the security seal can be guided out, the receiving chamber, when the upper part is in guided-out positions relative to the lower part, opening out at the outlet opening. In blocked positions, a blocking segment on the bottom of the upper part blocks the outlet opening.

Once the safeguard body has been removed from the immersion pipe, a separated lower segment of the security seal can thus be guided out via the outlet opening by rotating the upper part into a guiding-out position, and disposed of in a controlled manner.

According to a first variant, the immersion pipe can be closed off with a closure. The tamper-evident safeguard can be attached to the immersion pipe that has been sealed with the closure.

The closure and the tamper-evident safeguard then form separate units.

According to another variant, the tamper-evident safeguard forms a closure means for the immersion pipe.

The tamper-evident safeguard therefore fulfills not only the function of safeguarding against tampering, but at the same time also forms the closure for the immersion pipe, such that in this case, there is no need for a separate closure for the immersion pipe.

Advantageously, the lower part of the safeguard body has fixing means for fixing to the immersion pipe.

These fixing means are adapted to fastening means on the immersion pipe that are also used to fasten the removal head.

If the removal head is fastened by axial displacement to constitute a form-locked or force-locked connection between the removal head and immersion pipe, the tamper-evident safeguard is advantageously fixed to the immersion pipe in the same manner.

According to another variant, the removal head is screwed onto the immersion pipe. Then, the tamper-evident safeguard is expediently screwed onto the immersion pipe. Fastening means for this purpose are formed by an outer thread.

The safeguard body can then be screwed by the outer thread on the lower part onto an inner thread of the immersion pipe, which inner thread advantageously also serves for fixing the removal head.

The upper part of the safeguard body is adapted to be rotatably mounted on the lower part.

The upper part and the lower part are arranged coaxially along a shared axis of symmetry running in the axial direction, wherein the upper and the lower part are essentially rotationally symmetrical to this axis of symmetry. This axis of symmetry also forms the axis of rotation about which the upper part can be rotated relative to the lower part. This rotation occurs necessarily when the tamper-evident safeguard is to be screwed off of the immersion pipe, by which the security seal is necessarily destroyed, by which a reliable safeguard against tampering is obtained.

According to an embodiment that is advantageous from a design perspective, the upper part is constituted as circular disk-shaped, the peripheral regions of which lie against the upper edge of the immersion pipe when the tamper-evident safeguard is fastened on the immersion pipe.

It is advantageous that the lower part is a rotationally-symmetrical hollow body, on the top of which the receiving chamber opens out, and that the upper part mounted on the lower part projects in the radial direction with its peripheral region over the jacket surface of the lower part.

Therefore, in the case of a tamper-evident safeguard fitted on the immersion tube, only the flat-profiled upper part projects over the upper edge of the immersion pipe. This is advantageous, therefore, since the tamper-evident safeguard is not disturbed during handling of a container and there is no risk of it being ripped off of the container.

According to a second variant of the invention, the closure means can be fixed inside the container opening of the container. The tamper-evident safeguard is part of the closure means.

Hazardous substances, e.g., special chemicals, which are preferably in liquid form, can be stored in the container.

The container can be designed particularly in the shape of a barrel.

Advantageously, the closure means have a closure body that can be fixed inside the container opening. The closure body has a central seating that penetrates the closure body in the axial direction, and the tamper-evident safeguard can be mounted inside the central seating.

The safeguard body forming the tamper-evident safeguard therefore is a component of the closure means.

In principle, the closure means can be fixed inside the container opening by means of a displacement movement.

Accordingly, the safeguard body can then be secured inside the closure body by means of a displacement movement.

Especially advantageously, the closure body can be fixed to the container opening by means of a screw connection.

According to an embodiment that is advantageous from a design perspective, a hollow cylindrical lug projecting from the top of the container is provided and has an outer thread that delimits the container opening. The closure body can be fixed to the lug.

For this purpose, the closure body has a hollow cylindrical side wall. On the inner side thereof, an inner thread is provided that can be screwed onto the outer thread of the container.

Corresponding to the screw connection between the container opening and the closure body, an outer thread is provided on the outer side of the lower part of the safeguard body, and the outer thread can be screwed into an inner thread of the closure body, that delimits the seating.

Advantageously, when a safeguard body is mounted in the borehole of the closure body, the upper part of the safeguard body is exposed on the top of the closure body.

An outer thread is provided on the outer side of the lower part of the safeguard body, and the outer thread can be screwed into an inner thread of the closure body, that delimits the seating.

A completely leakproof, gas-tight connection between the closure body and safeguard body can then be effected thereon in a simple manner, such that a seal is provided on the bottom of the peripheral region of the upper part, and the seal seals the juncture to the closure body.

Advantageously, the seal is formed by a circumferential sealing ring running in the circumferential direction of the safeguard body.

According to an advantageous embodiment, seatings to which an actuation means can be mounted in such a manner that rotation is prevented are provided on the top of the upper part of the safeguard body.

In the event that the container is a barrel, the actuation means is advantageously constituted as a bung wrench.

The actuation means or the bung wrench serves to close or open the container opening by means of the closure means.

To open the container opening, the functioning is then such that when the actuation means is actuated, first the upper part is rotated against the lower part of the safeguard body, by which the lower segment of the security seal is separated. When the actuation means is further actuated, the closure means is screwed out of the container opening.

The closure means of the tamper-evident safeguard is thereby secured against tampering.

BRIEF DESCRIPTION OF THE DRAWINGS

The invention is explained in the following with reference to the drawings. They show.

DETAILED DESCRIPTION OF THE PREFERRED EMBODIMENTS

Figure 1:
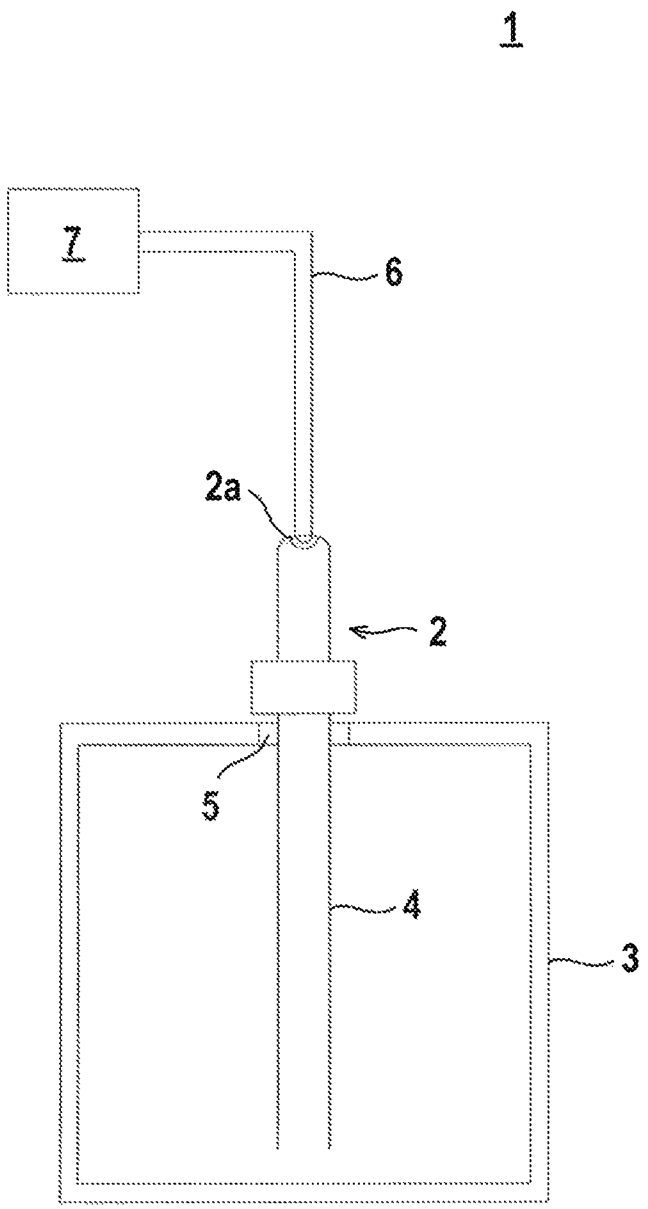
FIG. 1: A schematic illustration of a removal system with an associated container.

FIG. 1 shows a removal system 1 in schematic form. The removal system 1 comprises a removal head 2 that can be attached to a container 3 which can be designed particularly in the shape of a barrel. A liquid is stored in the container 3. The liquids stored in such containers 3 are typically special liquid chemicals.

The container 3 has an immersion pipe 4. The immersion pipe 4 is mounted inside a bung head 5 which sits in a container opening of the container 3, and is thus securely connected to the container 3. The longitudinal axis of the immersion pipe 4 runs in the vertical direction.

The removal head 2 is used for removing liquids from the container 3. The removal head 2 can also be used for filling containers 3. For this purpose, the removal head 2 has a connection for liquids 2*a* at its upper end. A line 6 that leads to a pump 7 is connected to this connection for liquids 2*a*. The line 6 can be constituted in the form of a hose.

The pump 7 is controlled by a control unit (not shown).

Figure 2A:
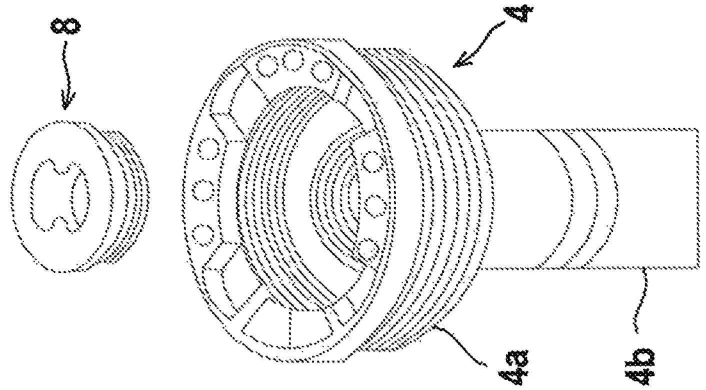
FIG. 2A: An immersion pipe of the container with an associated closure.
Figure 2B:
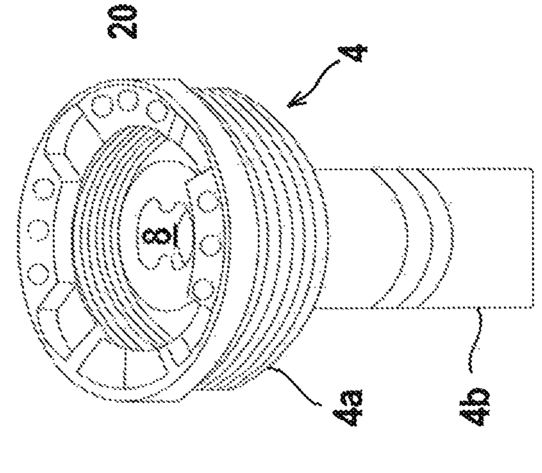
FIG. 2B: An immersion pipe according to FIG. 2A with inserted closure.

The container 3 forms a transportable unit. The immersion pipe 4 is secured as shown in FIGS. 2A to 2D for transport of the container 3. As shown, the immersion pipe has a head part 4*a* to the bottom of which connects a pipe body 4*b*. To secure the container 3 for transport, once the removal head 2 is removed from the immersion pipe 4, a closure 8 is guided into the head part 4*a* of the immersion pipe 4 and fixed there, particularly by screwing (FIG. 2A, 2B).

Figure 2C:
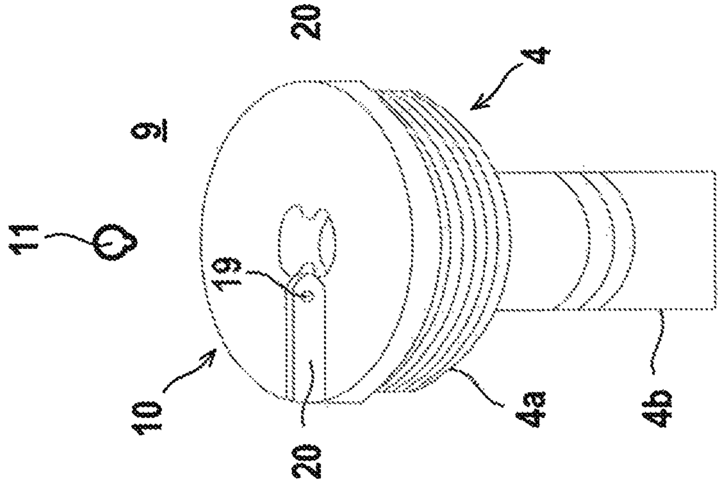
FIG. 2C: Arrangement according to FIG. 2B with a safeguard body arranged on top of the immersion pipe and an associated security seal of a tamper-evident safeguard.
Figure 2D:
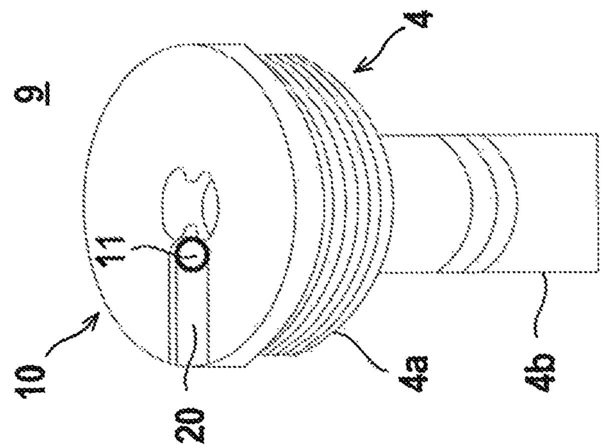
FIG. 2D: The arrangement according to FIG. 2C with security seal arranged on the safeguard body.

A tamper-evident safeguard is applied to the thus sealed immersion pipe 4 (FIGS. 2C, 2D). First, a safeguard body 10 of the tamper-evident safeguard 9 is fastened to the head part 4*a* of the immersion pipe 4, preferably by a screw connection (FIG. 2C). Then a security seal 11 is fastened to the safeguard body 10 of the tamper-evident safeguard, preferably by latching in a borehole 19 in the safeguard body 10

(FIGS. 2C and 2D). The tamper-evident safeguard constituted in this manner forms a protection against tampering, since the container 3 can then only be opened when the security seal 11 has previously been broken open.

Figure 3A:
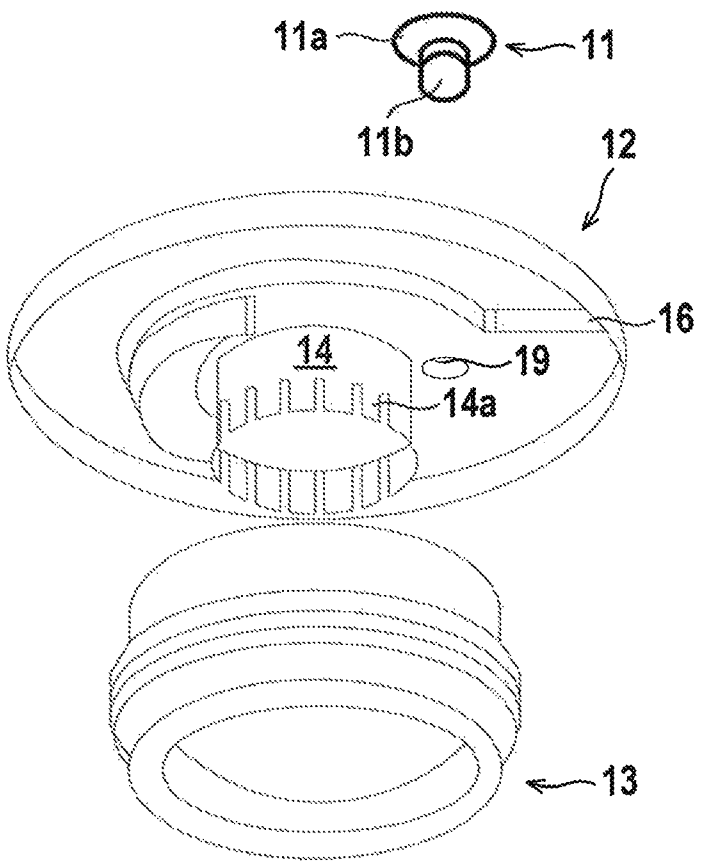
FIG. 3A: Components of the tamper-evident safeguard according to FIGS. 2C and 2D with a first perspective illustration.
Figure 3B:
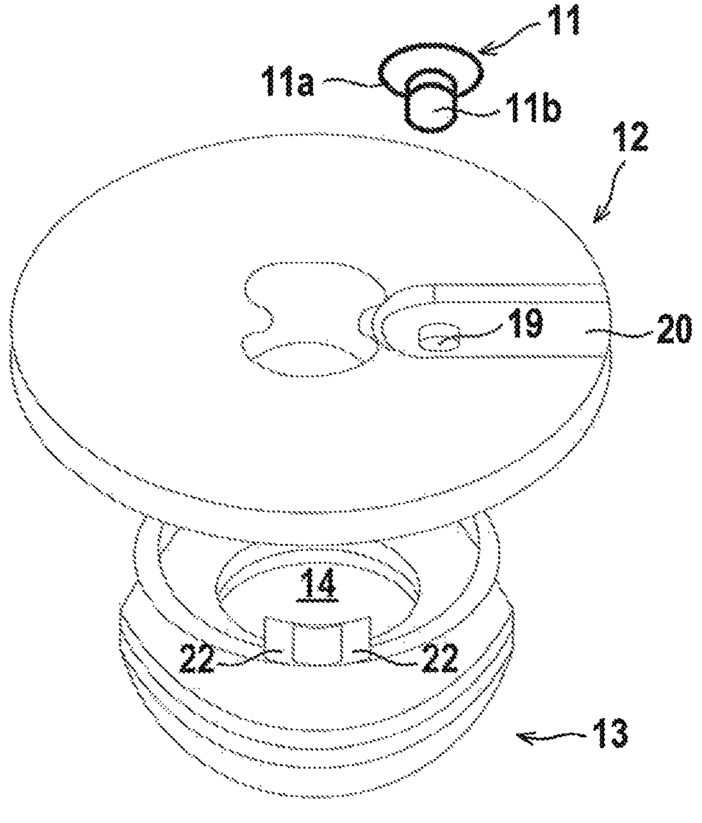
FIG. 3B: Components of the tamper-evident safeguard according to FIGS. 2C and 2D with a first perspective illustration with a second perspective illustration.
Figure 4:
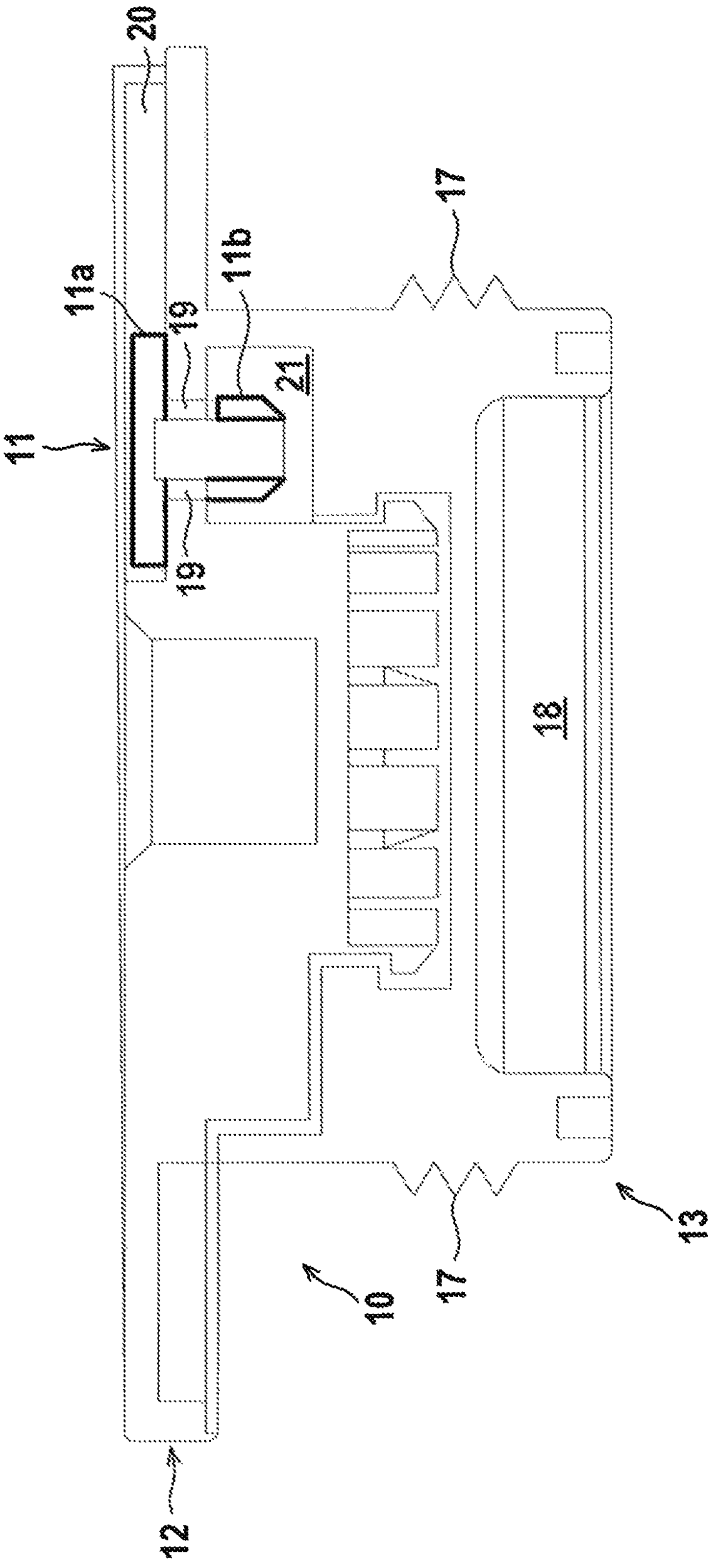
FIG. 4: A cross-sectional illustration of the tamper-evident safeguard according to FIGS. 3A and 3B.

FIGS. 3A, 3B show the individual components of the tamper-evident safeguard 9 according to the invention; FIG. 4 shows the tamper-evident safeguard 9 in the assembled state.

The security seal 11 has a rotationally symmetrical, essentially mushroom-shaped geometry. The security seal 11 has a circular-disk-shaped upper segment 11*a* and a lower segment 11*b* adjacent thereto. The diameter of the upper segment 11*a* is significantly greater than the diameter of the lower segment 11*b*.

The safeguard body 10 consists of an upper part 12 forming a cover part and a lower part 13 forming a base part, and both have a rotationally symmetrical contour.

The upper part 12 is essentially in the shape of a circular disk from the bottom of which projects a lug 14 with latching means 14*a*. The lug 14 can be latched into an arrangement of the lower part 13. The safeguard body 10 is thus assembled. The lug 14 forms a rotary mount, such that the upper part 12 can be rotated about an axis of rotation running in an axial direction of rotation of the safeguard body 10 relative to the lower part 13.

Furthermore, a blocking segment 16 that extends over an angle range of the upper part 12 projects from the bottom of the upper part 12.

There is an outer thread 17 on the outer side of the lower part 13, with which the safeguard body 10 can be screwed into the immersion pipe 4. The recess 18 on the bottom of the lower part 13 is used to receive the closure 8 of the immersion pipe 4.

The upper part 12 of the safeguard body 10 has a borehole 19 into which the lower segment 11*b* of the security seal 11 can be inserted. The borehole 19 lies inside a depression 20 on the top of the upper part 12, which forms a seating for the upper segment of the security seal 11. The upper segment 11*a* is mounted in the depression 20 with little play (FIGS. 2D and 4). The lower segment 11*b* of the security seal 11 projects into a receiving chamber 21 of the lower part 13 of the safeguard body 10.

Crosspieces 22 provided on the lower part project into this receiving chamber 21.

An outlet opening 23 is provided on the jacket surface of the lower part 13 (FIGS. 5A to 5E). Depending on the rotary position of the upper part 12 relative to the lower part 13, the receiving chamber 21 opens out at the outlet opening 23 or the blocking segment 16 blocks the outlet opening 23.

To secure the container 3 for transport 4, the closure 8 is attached to the immersion pipe 4 (FIGS. 2A, 2B), and the tamper-evident safeguard 9 is then attached to the immersion pipe 4 (FIGS. 2C, 2D).

Figure 5A:
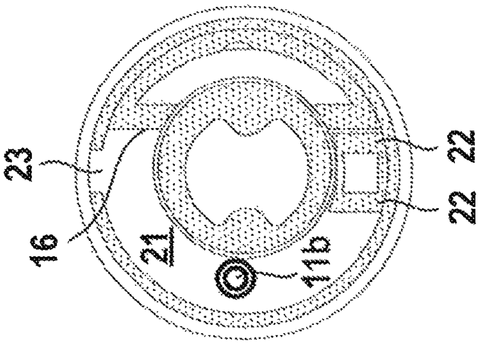
FIG. 5A: The tamper-evident safeguard according to FIG. 4 in a first phase of actuation.

When the tamper-evident safeguard 9 is attached to the immersion pipe 4, the upper part 12 of the safeguard body 10 lies against the upper edge of the head part 4*a* of the immersion pipe 4, while the lower part 13 of the safeguard body 10 lies completely inside the head part 4*a* of the immersion pipe 4 (FIG. 4). As FIG. 4 furthermore shows, the upper segment of the security seal 11 then lies inside the depression 20 on the upper part 12, while the lower segment of the security seal 11 projects into the receiving chamber of the lower part 13. FIG. 5A also shows this situation.

Figure 5B:
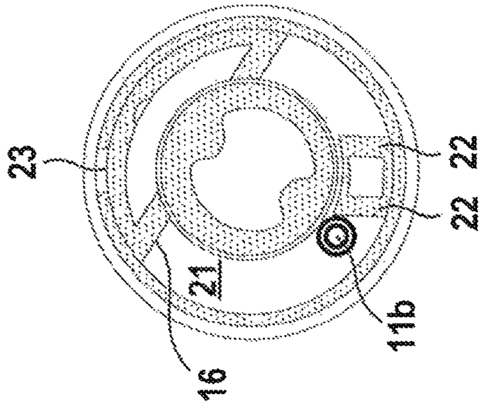
FIG. 5B: The tamper-evident safeguard according to FIG. 4 in a second phase of actuation.

To open the container 3, the safeguard body 10 must first be screwed off of the head part 4*a* of the immersion pipe 4. To do so, an operator turns the upper part 12 of the safeguard body 10 in the opening direction. Since the upper part 12 is rotatably mounted on the lower part 13, at first only the upper part 12 is rotated until the lower segment 11*b* of the security seal 11 abuts one of the crosspieces 22 (FIG. 5B).

Figure 5C:
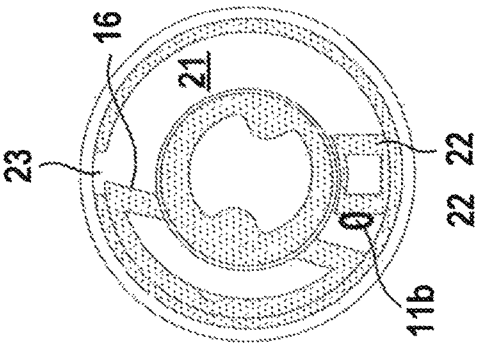
FIG. 5C: The tamper-evident safeguard according to FIG. 4 in a third phase of actuation.

If the upper part 12 is rotated farther, the lower segment 11*b* is separated on the edge of the crosspiece 22, i.e., the crosspiece 22 forms a mechanical separation means with a tear-off edge. FIG. 5C shows the separated lower segment 11*b* of the security seal 11. When the upper part 12 is then rotated farther, the blocking segment 16 abuts the crosspieces 22, such that upon a further rotation of the upper part 12, the lower part 13 is rotated along with it, and consequently the safeguard body 10 is screwed out of the head part 4*a* of the immersion pipe 4.

Figure 5D:
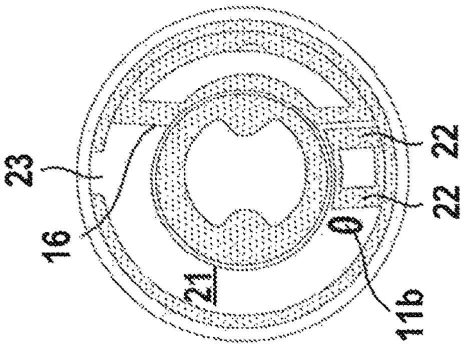
FIG. 5D: The tamper-evident safeguard according to FIG. 4 in a fourth phase of actuation.
Figure 5E:
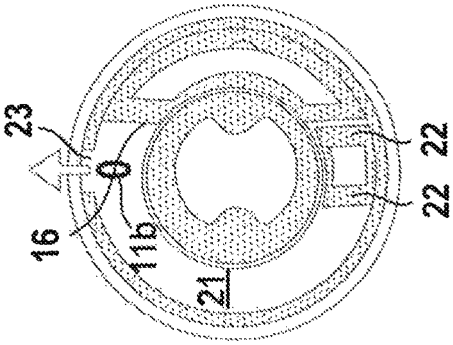
FIG. 5E: The tamper-evident safeguard according to FIG. 4 in a fifth phase of actuation.

FIGS. 5D, 5E show the safeguard body 10 screwed off of the immersion pipe 4. The upper part 12 is then rotated relative to the lower part 13, as illustrated in FIG. 5*d*, such that in a guiding-out position, the receiving chamber 21 opens out at the outlet opening 23. The lower segment 11*b* of the security seal 11 can then be guided out through the outlet opening 23 and disposed of in a controlled manner.

Figure 6:
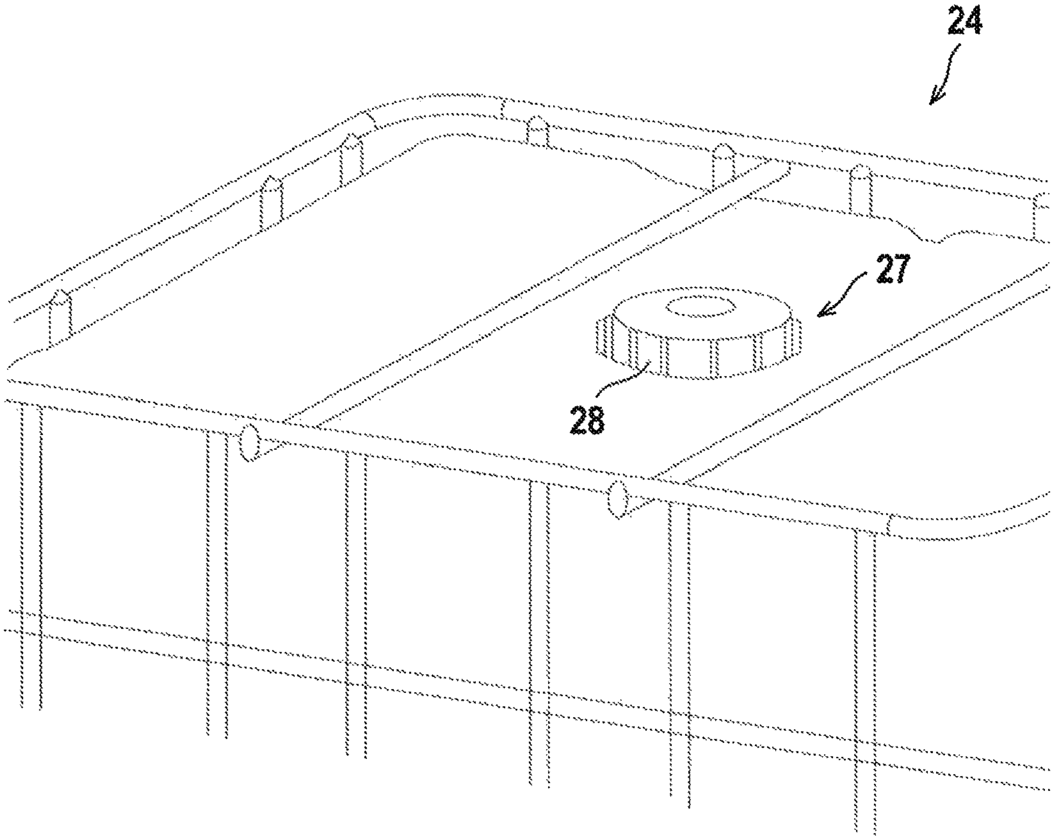
FIG. 6: An embodiment with a container in the form of a barrel.
Figure 7:
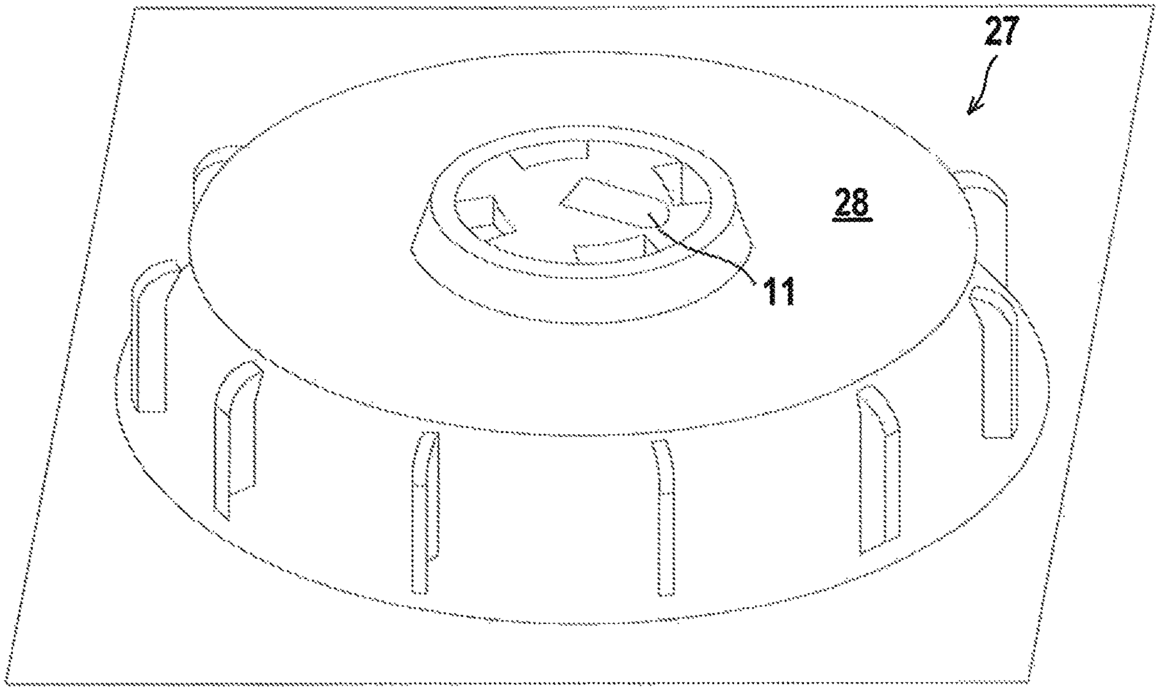
FIG. 7: An illustration of a section of the container according to FIG. 6 with a closure means.

FIGS. 6 to 11 show a variant of the arrangement according to the invention. This arrangement has a barrel 24 for receiving a storage medium, particularly liquids (FIG. 6). On the top of the barrel 24, there is a container opening in the form of a hollow cylindrical lug 25 projecting from the top of the barrel 24 and having an outer thread 31. As shown in FIGS. 6 and 7, a closure means 27 can be screwed onto this lug 25.

The closure means 27 has a closure body 28 in the form of a cap. There is an inner thread 29 on the inner side of the cylindrical side wall of the closure body 28, with which the closure body 28 can be screwed onto the lug 25.

The closure body 28 has a central hollow cylindrical seating 30 running in the axial direction, in which the safeguard body 10 forming the tamper-evident safeguard is mounted.

Figure 8:
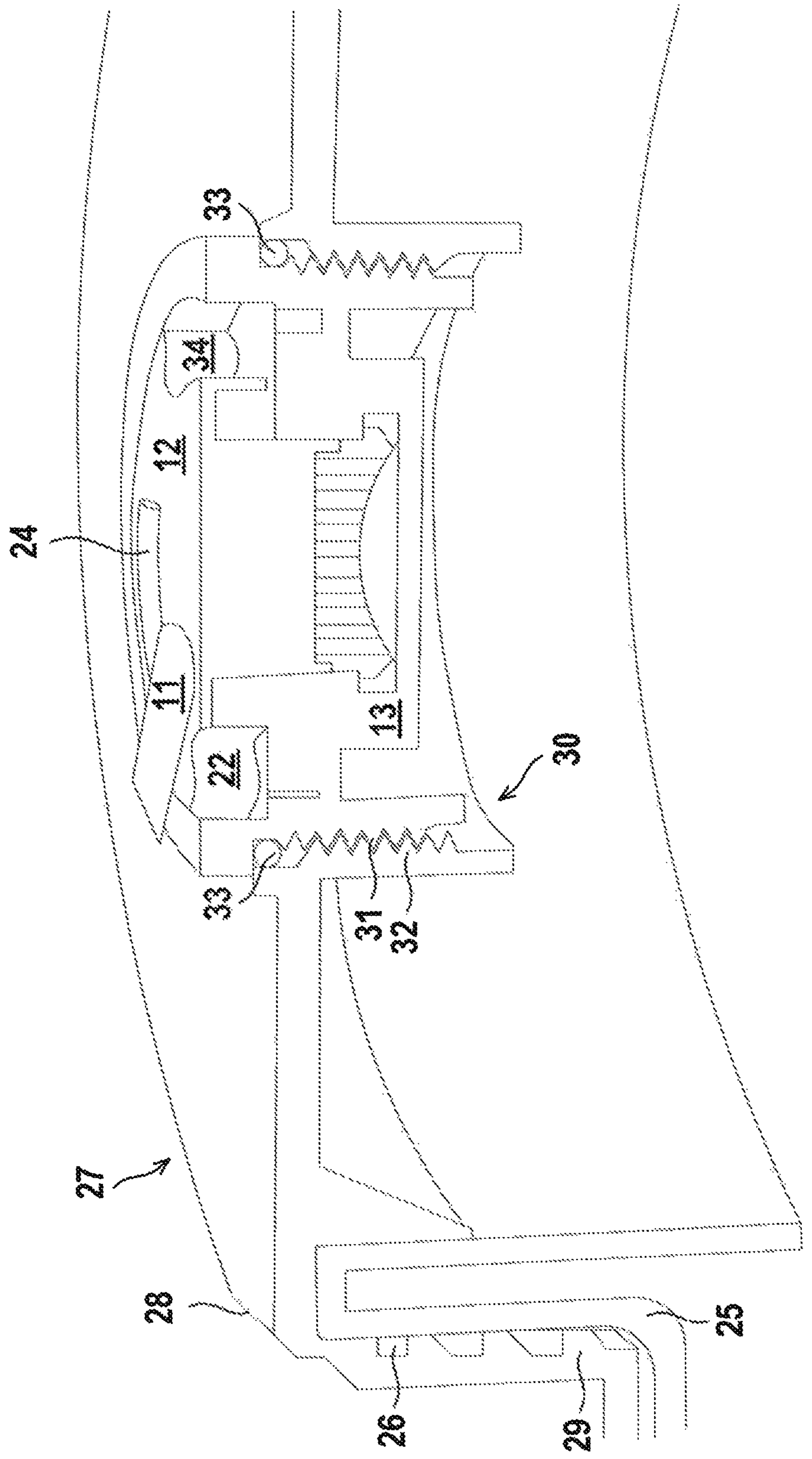
FIG. 8: A cross-sectional illustration of the arrangement according to FIG. 7.

The safeguard body 10 has a structure that essentially corresponds to the safeguard body 10 in FIGS. 3A and 3B to 5. Accordingly, the safeguard body 10 has an upper part 12, and a lower part 13 that is rotatably mounted in the upper part 12. The rotary mounting is again effected with the lug 14. The lower part 13 has an outer thread 31 which is screwed onto an inner thread 32 of the hollow cylindrical lug 25, by which the safeguard body 10 is fixed to the closure body 28 (FIG. 8).

The edge of the upper part 12 projecting beyond the lower part 13 in the axial direction lies against the closure body 28. A sealing ring 33 runs along the lower part of an edge of the upper part 12 in the circumferential direction of the edge, and seals to gas-tightness the juncture between the safeguard body 10 and the closure body 28.

Corresponding to the safeguard body 10 of FIGS. 3A and 3B to 5, the safeguard body 10 of FIGS. 8 to 11 also has a security seal 11 which has an upper segment 11*a* lying against the top of the upper part 12 and a lower segment 11*b*, adjoining it, whose diameter is again significantly smaller than that of the upper segment.

The lower segment 11*b* of the security seal 11 projects through an opening in the upper part 12 into a receiving chamber 21 which is open on the top of the lower part 13 facing the upper part 12. In a manner analogous to the embodiment of FIGS. 3A and 3B to 5, crosspieces 22 provided on the lower part 13 project into this receiving chamber.

Figure 9:
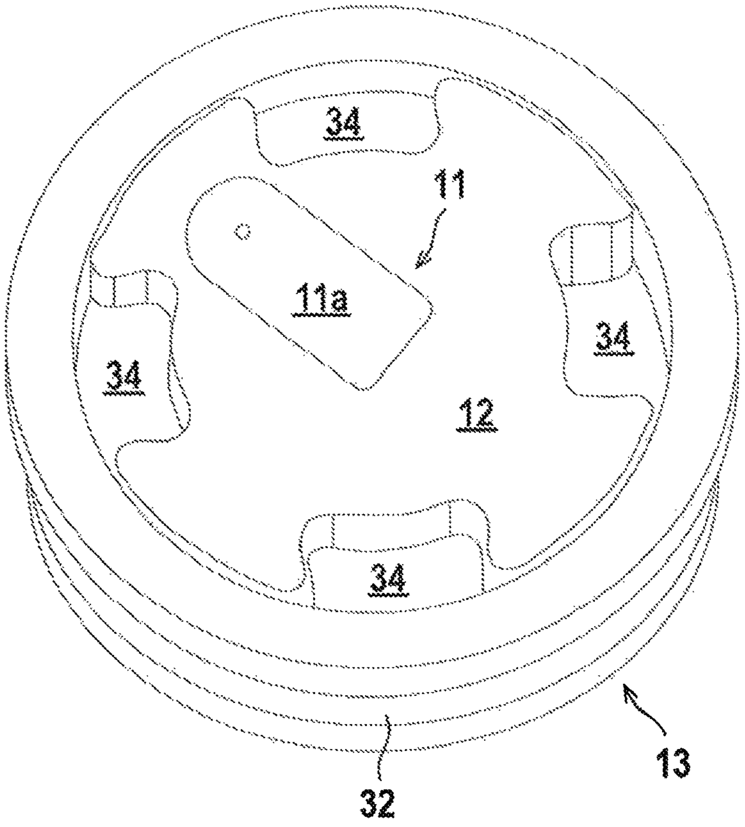
FIG. 9: An individual illustration of the safeguard body of the arrangement of FIGS. 7 and 8.
Figure 10:
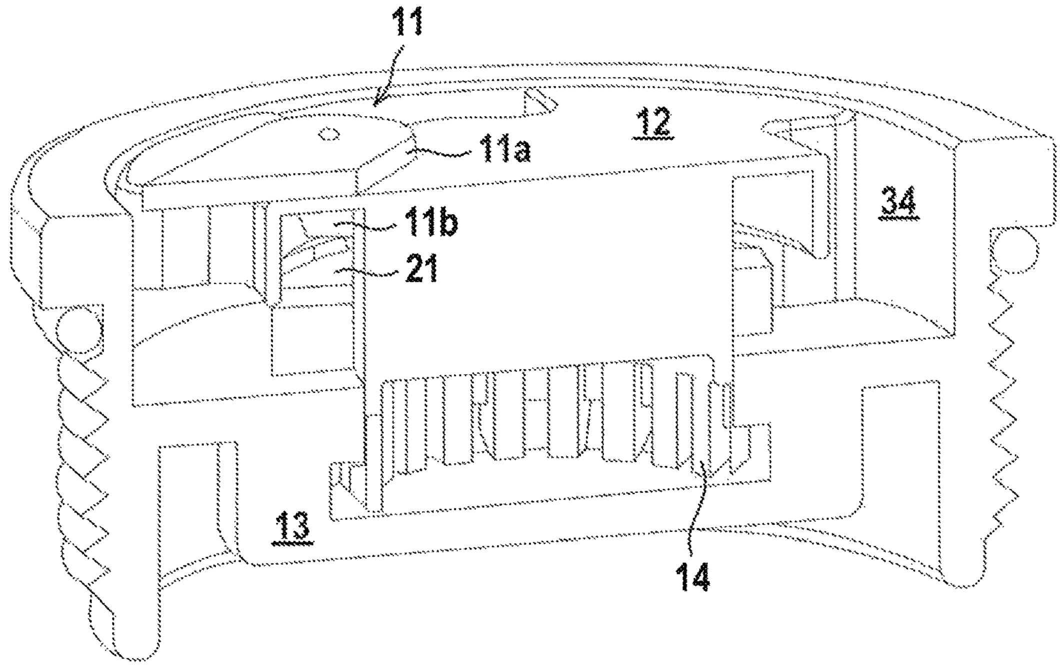
FIG. 10: A cross-sectional illustration of the safeguard body according to FIG. 9.

In other respects, too, the structure of the safeguard body 10 of FIGS. 8 to 10 corresponds to the embodiment according to FIGS. 5A to 5E.

As is evident from FIGS. 8 to 11, four identical notches 34, respectively offset relative to one another by 90°, opening out on the top of the upper part 12 of the safeguard body 10 are provided.

Figure 11:
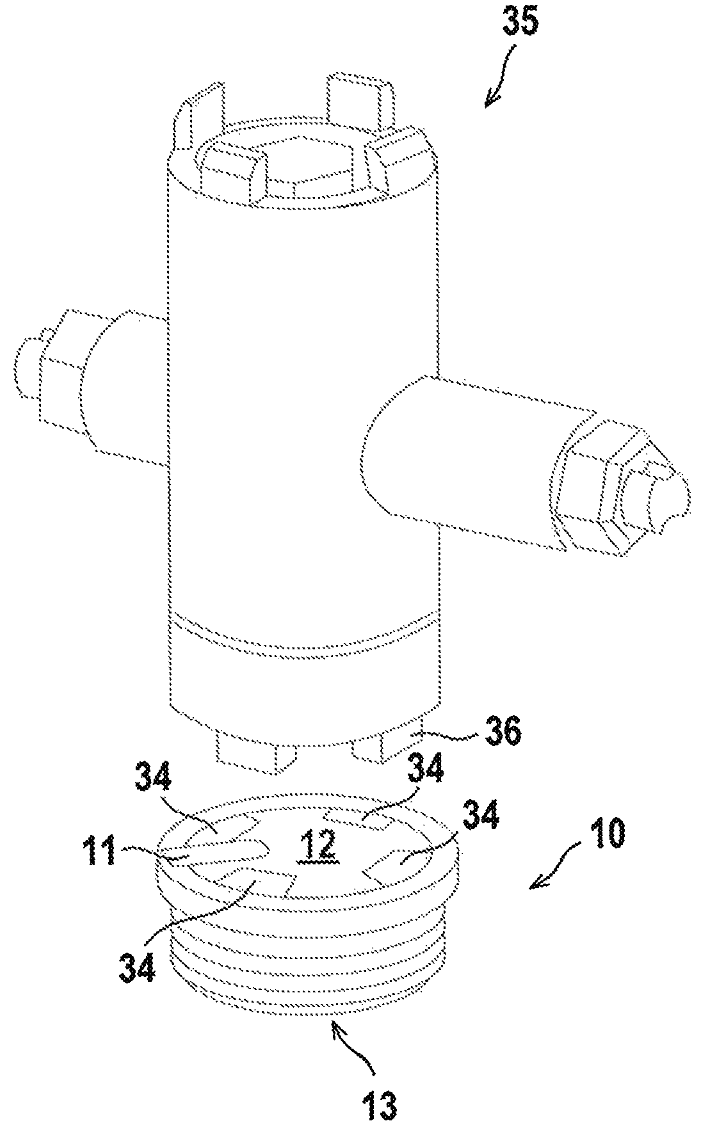
FIG. 11: An illustration of the safeguard body according to FIGS. 9 and 10 with an associated bung wrench.

These notches 34 form seatings for fixing an actuation means in the form of a bung wrench 35 (FIG. 11). The bung wrench 35 has four identical protrusions 36 respectively offset relative to one another by 90° that open out on the bottom of the bunch wrench 35 and correspond to the notches 34, the contours of the protrusions 36 being adapted to the contours of the notches 34. For fixing the bung wrench 35 to the safeguard body 10, the protrusions of the bung wrench 35 are inserted into the notches 34 of the safeguard body 10, where they are mounted with little play.

When the bung wrench 35 is fixed to the safeguard body 10, the closure means 27 can be fixed in, or released from, the container opening by turning the bung wrench 35.

Once the closure means 27 is fixed to the container opening, it is protected against tampering by the safeguard body 10 forming the tamper-evident safeguard. If the closure means 27 is opened by rotating the bunch wrench fixed to the safeguard body 10, first the upper part 12 rotates relative to the lower part 13 of the safeguard body 10, by which the lower segment 11*b* of the security seal 11 is separated from the upper segment 11*a* of the safety seal 11 and is received in the receiving chamber 21, in a manner corresponding to FIGS. 5A to 5E. By further rotating the bung wrench 35, the closure means 27, i.e., the closure body 28 with the safeguard body 10, is screwed out of the container opening.

After screwing off the closure means 27, the safeguard body 10 can be screwed off about the closure body 28 in a manner corresponding to the embodiments of FIGS. 5A to 5E. The upper part 12 can then be rotated relative to the lower part 13 of the safeguard body such that the lower segment of the security seal 11 is guided out through the outlet opening 23, as shown in FIG. 5E, and disposed of in a controlled manner.

LIST OF REFERENCE NUMERALS (1) removal system
(2) removal head
(2*a*) connection for liquid
(3) container
(4) immersion pipe
(4*a*) head part
(4*b*) pipe body
(5) bung head
(6) line
(7) pump
(8) closure
(9) tamper-evident safeguard
(10) safeguard body
(11) security seal
(11*a*) upper segment
(11*b*) lower segment
(12) upper part
(13) lower part
(14) lug
(14*a*) latching means
(15) notch
(16) blocking segment
(17) outer thread
(18) recess
(19) borehole
(20) depression
(21) receiving chamber
(22) crosspiece
(23) outlet opening
(24) barrel
(25) lug
(26) outer thread
(27) closure means
(28) closure body
(29) inner thread
(30) hollow cylindrical seating
(31) outer thread
(32) inner thread
(33) sealing ring
(34) notch
(35) bung wrench
(36) protrusion

The invention claimed is:

1. An arrangement with a container (3) having a container opening through which a storage medium can be supplied to the container (3) or removed from the container (3), wherein the container opening can be sealed with a closure means (27) and can be secured with a tamper-evident safeguard (9), characterized in that the tamper-evident safeguard (9) has a safeguard body (10) with a lower part (13), and an upper part (12) displaceably mounted on the lower part (13), and a security seal (11), that the security seal (11) is mounted on the safeguard body (10), which is fastened to an immersion pipe (4), that when the tamper-evident safeguard is released, a relative movement occurs between the upper part (12) and lower part (13), by which a segment of the security seal (11) is separated and guided to a receiving chamber (21) of the lower part (13).

2. The arrangement according to claim 1, characterized in that the upper part (12) of the safeguard body (10) is rotatably mounted on the lower part (13).

3. The arrangement according to claim 1, characterized in that the upper part (12) is designed in the shape of a circular disk, and/or that the lower part (13) is a rotationally symmetrical hollow body on whose top the receiving chamber (21) opens out, and that the upper part (12) mounted on the lower part (13) projects with its peripheral region in the radial direction beyond the jacket surface of the lower part (13).

4. The arrangement according to claim 1, characterized in that an outlet opening (23) is provided on the jacket surface of the lower part (13), through which the separated lower segment of the security seal (11) can be guided out, wherein in guiding-out positions of the upper part (12) relative to the lower part (13), the receiving chamber (21) opens out at the outlet opening (23), and wherein in blocked positions, a blocking segment (16) on the bottom of the upper part (12) blocks the outlet opening (23).

5. The arrangement according to claim 1, characterized in that the security seal (11) has an upper segment (11*a*) and a lower segment (11*b*), wherein when the tamper-evident safeguard (9) is secured to the closure means (27), the upper segment (11*a*) of the security seal (11) is mounted in a seating of the upper part (12) and the lower segment (11*b*) of the security seal (11) projects into the region of the receiving chamber (21).

6. The arrangement according to claim 5, characterized in that the seating is formed by a depression on the top of the upper part (12), wherein the edge of the upper segment (11*a*) of the security seal (11) tightly abuts the edge of the upper part (12) delimiting the depression (20).

7. The arrangement according to claim 1, characterized in that during the relative movement of the upper part (12) relative to the lower part (13), the lower segment (11*b*) of the security seal (11) is guided against a mechanical separation means and is thereby separated from the upper segment (11*a*) of the security seal (11).

8. The arrangement according to claim 7, characterized in that the mechanical separation means is formed by a stop projecting into the receiving chamber (21), wherein the stop is formed by a crosspiece (22) in the lower part (13).

9. The arrangement according to claim 1, characterized in that the closure means (27) can be fixed inside the container opening of the container (3), and that the tamper-evident safeguard (9) is part of the closure means (27).

10. The arrangement according to claim 9, characterized in that, on the outer side of the lower part (13) of the safeguard body (10), an outer thread (31) is provided which can be screwed into an inner thread (32) of the closure body (28), the inner thread (32) delimiting the hollow cylindrical seating (30).

11. The arrangement according to claim 9, characterized in that when the safeguard body (10) is mounted in the hollow cylindrical seating (30) of the closure body (28), its upper part (12) is exposed on the top of the closure body (28), and/or that a peripheral region of the upper part (12) of the safeguard body (10) projecting beyond the lower part (13) in the radial direction lies against the top of the container (3).

12. The arrangement according to claim 11, characterized in that a seal is provided on the bottom of the peripheral region of the upper part (12), which seals the juncture to the closure body (28), wherein the seal is formed by a sealing ring (33) running in the circumferential direction of the safeguard body (10).

13. The arrangement according to claim 9, characterized in that the closure means (27) has a closure body (28) that can be fixed inside the container opening, and that the closure body (28) has a central hollow cylindrical seating (30) that penetrates it in the axial direction, inside which the safeguard body (10) of the tamper-evident safeguard (9) can be mounted.

14. The arrangement according to claim 13, characterized in that the closure body (28) can be fixed to the container opening by means of a screw connection.

15. The arrangement according to claim 14, characterized in that a hollow cylindrical lug (25) projecting from the top of the container (3) is provided with an outer thread (26) that delimits the container opening, wherein the closure body (28) can be fixed to the lug (25), and that the closure body (28) has a hollow cylindrical side wall on whose inner side an inner thread (29) is provided that can be screwed onto the outer thread (26) of the container (3).

16. The arrangement according to claim 1, characterized in that an immersion pipe (4) is mounted inside the container (3), and an removal head (2) of a removal system (1) can be connected to the immersion pipe (4) in order to supply a liquid forming the storage medium to the container (3) or to remove such a liquid therefrom, wherein, when the removal head (2) is taken off, the immersion pipe (4) can be sealed and secured with the tamper-evident safeguard (9).

17. The arrangement according to claim 16, characterized in that the immersion pipe (4) can be closed off with a closure (8), and that the tamper-evident safeguard (9) can be applied to the immersion pipe (4) sealed with the closure (8) or that the tamper-evident safeguard (9) constitutes a closure means (27) for the immersion pipe (4).

18. The arrangement according to claim 16, characterized in that the peripheral region of the upper part (12) of the safeguard body (10) lies against the upper edge of the immersion pipe (4) when the tamper-evident safeguard (9) is fastened to the immersion pipe (4).

19. The arrangement according to claim 16, characterized in that the lower part (13) of the safeguard body (10) has fixing means for fixing to the immersion pipe (4).

20. The arrangement according to claim 19, characterized in that the fixing means are formed by an outer thread (17) with which the safeguard body (10) can be screwed into the immersion pipe (4).

21. The arrangement according to claim 16, characterized in that seatings to which an actuation means can be mounted in such a manner that rotation is prevented are provided on the top of the upper part (12) of the safeguard body (10).

22. The arrangement according to claim 21, characterized in that when the actuation means is actuated, first the upper part (12) is rotated against the lower part (13) of the safeguard body (10), by which the lower segment of the security seal (11) is separated, and that when the actuation means is further actuated, the closure means (27) is screwed out of the container opening.

23. The arrangement according to claim 21, characterized in that the container (3) is a barrel (24), and that the actuation means is a bung wrench (35).

* * * * *